US008170004B2

(12) United States Patent
Cooke et al.

(10) Patent No.: US 8,170,004 B2
(45) Date of Patent: May 1, 2012

(54) SHARED DSL NETWORK AND DEPLOYMENT METHOD

(75) Inventors: Stephen P. Cooke, Calgary (CA); Tino Zottola, Beaconsfield (CA); John Bruno, Allen, TX (US)

(73) Assignee: Genesis Technical Systems Corp., Calgary (CA)

( * ) Notice: Subject to any disclaimer, the term of this patent is extended or adjusted under 35 U.S.C. 154(b) by 877 days.

(21) Appl. No.: 11/463,240

(22) Filed: Aug. 8, 2006

(65) Prior Publication Data

US 2007/0030856 A1    Feb. 8, 2007

Related U.S. Application Data

(60) Provisional application No. 60/706,022, filed on Aug. 8, 2005.

(51) Int. Cl.
H04L 12/28    (2006.01)
H04L 12/66    (2006.01)

(52) U.S. Cl. ........................................ 370/352; 370/389

(58) Field of Classification Search .................. 750/465, 750/474, 466, 412, 258, 389, 336, 352, 356, 750/535, 395, 353; 709/224; 370/237, 242, 370/216; 455/445, 517
See application file for complete search history.

(56) References Cited

U.S. PATENT DOCUMENTS

| | | | | |
|---|---|---|---|---|
| 4,733,391 A * | 3/1988 | Godbold et al. | ............... | 370/254 |
| 4,757,497 A * | 7/1988 | Beierle et al. | ................. | 370/405 |
| 4,835,763 A * | 5/1989 | Lau | ................................ | 370/223 |
| 5,159,595 A | 10/1992 | Flanagan et al. | | |
| 6,052,380 A * | 4/2000 | Bell | ............................. | 370/445 |
| 6,282,189 B1 * | 8/2001 | Eames | .......................... | 370/352 |
| 6,389,030 B1 | 5/2002 | Coden | | |
| 6,466,033 B2 * | 10/2002 | Soghomonian | ............... | 324/542 |
| 6,480,487 B1 * | 11/2002 | Wegleitner et al. | ........... | 370/354 |
| 6,577,621 B1 * | 6/2003 | Balachandran | ................ | 370/352 |
| 6,611,537 B1 * | 8/2003 | Edens et al. | ................... | 370/503 |
| 6,618,578 B1 * | 9/2003 | Petite | ............................... | 455/92 |
| 6,647,117 B1 * | 11/2003 | Wallace et al. | ............... | 379/413 |
| 6,754,174 B1 * | 6/2004 | Ben-Zur et al. | ............... | 370/225 |
| 6,798,769 B1 * | 9/2004 | Farmwald | ..................... | 370/352 |
| 6,999,479 B1 * | 2/2006 | Jha | ................................. | 370/535 |
| 7,043,250 B1 * | 5/2006 | DeMartino | .................... | 455/445 |
| 7,058,174 B2 * | 6/2006 | Posthuma | ...................... | 379/413 |
| 7,099,287 B1 * | 8/2006 | Oz et al. | ......................... | 370/258 |
| 7,197,768 B2 * | 3/2007 | Cole et al. | ....................... | 726/21 |

(Continued)

FOREIGN PATENT DOCUMENTS

CN    1230064 A    9/1999

(Continued)

OTHER PUBLICATIONS

Russian Patent Application No. 2008108983/09(009718) "Decision on Grant", Mar. 30, 2011, 18 pages.

(Continued)

*Primary Examiner* — Melanie Jagannathan
(74) *Attorney, Agent, or Firm* — Gordon & Jacobson, PC

(57) ABSTRACT

A DSL network topology is provided for the interconnections between a telecom carrier and households. Each household is provided with an HCC (Home Communications Centre) for facilitating digital communication. The digital communication includes DSL (Digital Subscriber Line) communication. A method of forming a DSL network such that existing copper pair wire is reused is also provided.

34 Claims, 7 Drawing Sheets

U.S. PATENT DOCUMENTS

| | | | |
|---|---|---|---|
| 2003/0108063 A1* | 6/2003 | Joseph et al. | 370/465 |
| 2004/0264440 A1 | 12/2004 | Wan et al. | |
| 2005/0265262 A1* | 12/2005 | Mizuguchi et al. | 370/258 |
| 2006/0064479 A1* | 3/2006 | Meged et al. | 709/224 |
| 2010/0098000 A1 | 4/2010 | Gerszberg et al. | |

FOREIGN PATENT DOCUMENTS

| | | |
|---|---|---|
| EP | 1239622 A2 | 9/2002 |
| EP | 1 239 622 | 11/2002 |
| JP | 4284048 A | 10/1992 |
| JP | 5046280 A | 2/1993 |
| JP | 5284170 A | 10/1993 |
| JP | 7050683 A | 2/1995 |
| JP | 7288492 A | 10/1995 |
| JP | 8130549 A | 5/1996 |
| JP | 2000517140 A | 12/2000 |
| JP | 2001230794 A | 8/2001 |
| JP | 2004530381 A | 9/2004 |
| JP | 2004336499 A | 11/2004 |
| RU | 2127960 C1 | 3/1999 |
| WO | 9510917 A1 | 4/1995 |
| WO | WO98/26531 | 6/1998 |
| WO | WO99/09713 | 2/1999 |
| WO | WO99/39478 | 8/1999 |
| WO | 03077459 A2 | 9/2003 |
| WO | WO03/077459 | 9/2003 |

OTHER PUBLICATIONS

Extended European Search Report for EP 06 77 5081, dated Oct. 10, 2011, 7 pages.

English language translation of the Office Action for Chinese Patent Application No. 200680029482.7 dated Nov. 9, 2011, 12 pages.

English language translation of Abstract for Japanese Application No. JP 2001230794, (Aug. 24, 2001), 1 page.

English language translation of Abstract for Japanese Application No. JP 2004336499, (Nov. 25, 2004), 1 page.

English language translation of Abstract for Japanese Application No. JP 2000517140, (Dec. 19, 2000), 1 page.

English language translation of Abstract for Japanese Application No. JP 7288492, (Oct. 31, 1995), 1 page.

English language translation of Abstract for Japanese Application No. JP 5284170, (Oct. 29, 1993), 1 page.

English language translation of the Official Action for Japanese Application No. JP 2008-525345, dated Dec. 27, 2011, 4 pages.

English language translation of Abstract for Japanese Application No. JP7050683, (Feb. 21, 1995), 1 page.

English language translation of Abstract for Japanese Application No. JP5046280, (Feb. 26, 1993), 1 page.

English language translation of Abstract for Japanese Application No. JP4284048, (Oct. 8, 1992), 1 page.

English language translation of Abstract for Japanese Application No. JP2004530381, (Sep. 30, 2004), 1 page.

English language translation of Abstract for Japanese Application No. JP8130549, (May 21, 1996), 1 page.

* cited by examiner

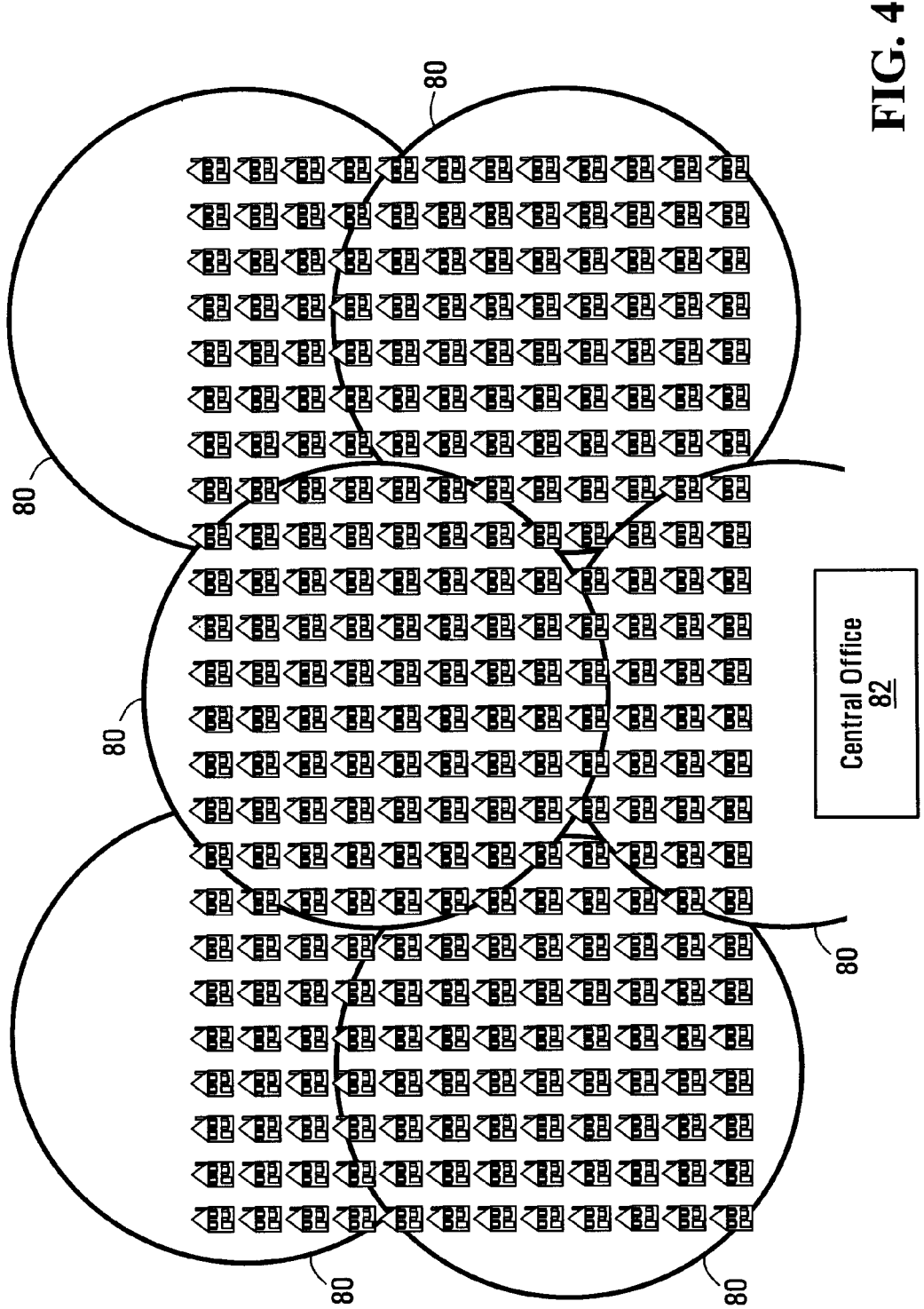

SHARED DSL NETWORK AND DEPLOYMENT METHOD

RELATED APPLICATION

This application claims the benefit of prior U.S. Provisional Patent Application No. 60/706,022 filed on Aug. 8, 2005 hereby incorporated by reference in its entirety.

FIELD OF THE INVENTION

The invention relates to telecommunications, and more particularly to wireline networks.

BACKGROUND

The "last mile" provides consumers a direct connection with a telecom carrier. The standard telecom network configuration in the "last mile" is called a star or hub configuration. Households typically have two or more copper pairs that converge into a single hub from which either higher cable count twisted pair cable, higher speed cable (such as T1/T3 in North America or E1/E3 around the world) or fibre transports the signals back to a CO (central office). The remote sites are often powered cabinets in residential districts.

Typically the largest single asset that telecom carriers possess is the twisted pairs that go into each household in their area. To replace this asset is enormously costly and has been delayed in the hopes that a much less expensive access technology would present itself. Wireless solutions are currently available but serious questions regarding security and available bandwidth persist. Furthermore, bypassing the "last mile" with a wireless solution renders all investment in the already installed twisted pairs useless. Most of the investment in the twisted pairs has been amortized since initial installation but telecom carriers like to maximize their Return On Investment (ROI).

Many telecom carriers offer some form of DSL (Digital Subscriber Line) service that enables Internet access over copper twisted pair phone lines. There are many versions of DSL with various levels of transmission bandwidth over various distances. Examples of DSL technologies include ADSL (Asynchronous DSL), SDSL (Symmetric DSL), and VDSL (Very high bit rate DSL). The latest is VDSL2 (Very high bit rate DSL version 2), which enables symmetric DSL service at about 50 Mb/s (mega bits per second) rates over short distances (1-2 kft or about ½ km) as shown in FIG. 7. Generally, as the bandwidth increases, the distance over which that bandwidth can be transmitted decreases. There are also other technologies that use Ethernet over twisted pair. Technology such as VoIP (Voice over Internet Protocol) has enabled competition from cable providers who have their own networks, including their own 'last mile', and are well funded via their entertainment offerings. There is a need for telecom carriers to provide much higher bandwidth at much greater distances from the CO than they currently do.

Fibre-based solutions are not practical solutions to the problems discussed herein. Fiber-to-the-Node (FTTN) or Fiber-to-the-Curb (FTTC) architectures can move DSLAMs (DSL Access Multiplexers) closer to the subscribers, thereby increasing the bandwidth available. However, the fiber, cabinet for the equipment, real estate for the cabinet, and power do not already exist in the telecom network. Installing this infrastructure is an enormous logistical effort and is incredibly expensive. Fiber-to-the-Premises (FTTP) takes the FTTC/N approach one step further by taking new fiber directly to the customer's house. The fiber does not already exist in the network so it has to be installed, again at great expense. The technologies that are being used for these rollouts are generally based on PON (Passive Optical Network) architectures. These architectures have been around for many years and have seen very little adoption until VoIP telephony became commercially viable.

Recently an industry initiative took another look at a method of sharing bandwidth, specifically on twisted pair networks. The premise is that if an original high bandwidth signal is split into several pieces and sent over several pairs as a single transmission path, then the bandwidth can be increased significantly at virtually every distance. This method assumes that there are additional pairs available for this purpose. Protocol-based overhead is inserted on each physical wire so that the signal, which is transmitted in several pieces, can be put back together in the correct order at the far end. This process is called 'bonding' and is being specified under the moniker G.BOND (ITU specifications G.998.1—ATM, 2—Ethernet, 3—inverse multiplexing). The difficulty in applying this method to the existing cable plant is that there are generally between 2 and 4 pairs going into each residence. If the current ADSL capability of 4 Mb/s at an average distance of 2.5 km from the CO is used, then this yields a maximum of 16 Mb/s available to each house. As it is more common that there are only 2 pairs in residences the maximum bandwidth would be 8 Mb/s in the same scenario. This is still considered to be very tight for video transmission, even with MPEG4 compression (which is currently not very common) as the bandwidth, jitter profile and latency, needs to be guaranteed.

Modifications to the twisted pair cable plant (i.e.: installing additional twisted pairs throughout the network) may be just as expensive as replacing it with fibre.

SUMMARY OF THE INVENTION

According to one broad aspect, the invention provides a wireline network comprising: at least one network connection connecting at least one telephony network switching device to a respective first customer communications node; a plurality of second customer communication nodes; a plurality of interconnections between the communication nodes such that all communication nodes are interconnected in a linear manner and have at least one communications path to the network switching device, each interconnection comprising a electrically conductive twisted wire pair; and a traffic add/drop function in each customer communications node.

In some embodiments, the traffic add/drop function comprises a packet add/drop function.

In some embodiments, the network switching device selected from a group consisting of central office, DLC (digital loop carrier) node, a network POP (point of presence).

In some embodiments, the network switching device is a gateway node in a pedestal.

In some embodiments, the wireline network and the at least one network connection connecting the at least one telephony network switching device to the respective first customer communications node comprises at least one connection between the gateway node and the respective first customer communications node.

In some embodiments, the gateway node is connected to a plurality of network-side electrically conducting twisted wire pairs operable to pass traffic to and from the at least one connection between the gateway node and the respective first customer communications node.

In some embodiments, the at least one connection between the gateway node and the respective first customer communications node comprises a respective network connection between the gateway node and each of two first customer communications nodes.

In some embodiments, the interconnections form a ring topology.

In some embodiments, traffic flows in both directions around the ring topology.

In some embodiments, the interconnections form a linear ADM (add drop multiplexer).

In some embodiments, the packet add/drop functionality in each customer communications node drops packets received on the network for the customer communications node, and adds packets to the network from the customer communications node.

In some embodiments, the packet add/drop function is in respect of DSL (Digital Subscriber Line) communication.

In some embodiments, the DSL communication is selected from a group consisting of ADSL (Asynchronous DSL), SDSL (Symmetric DSL), Uni-DSL (Universal DSL), VDSL (Very high bit rate DSL), and VDSL2 (Very high bit rate DSL version 2).

In some embodiments, each customer communications node comprises: circuitry for extracting power supply signals transmitted from the network switching device over the interconnections.

In some embodiments, for each customer communications node: the packet add/drop function extracts packets that are for the particular customer communications node, and regenerates all other packets and forwards them on; each packet dropped is passed on digitally to a digital interface, or converted to analog form and passed on to an analog interface.

In some embodiments, each customer communications node comprises: a local source of power.

In some embodiments, at least some of the interconnections are formed of sections of electrically conducting twisted wire pairs of an existing star topology network.

In some embodiments, each customer communications node comprises a transceiver adapted to communicate with another customer communications node over a wireless connection.

In some embodiments, the wireless connection forms part of an alternative communication path to the network switching device in case an existing communication path to the network switching device via the interconnections becomes unavailable.

In some embodiments, the wireline network further comprises: a second plurality of customer communications nodes; a plurality of interconnections between the second communication nodes such that all communication nodes of the second plurality are linearly connected, each interconnection comprising an electrically conductive twisted wire pair; and at least one wireless connection connecting at least one of the second plurality of customer communications nodes to one of the first plurality of customer communications nodes; and a traffic add/drop function in each of the second plurality of customer communications nodes.

According to another broad aspect, the invention provides a method of forming a DSL network comprising: employing an existing electrically conducting twisted wire pair connection from a network switching node to a first customer premises equipment; disconnecting a connection from the network switching node to second customer premises equipment and re-connecting the connection to the first customer premises equipment such that the first customer premises equipment and the second customer premises equipment are interconnected, and so on for other customer premises equipment.

In some embodiments, the disconnecting and re-connecting are performed in a patch panel in a pedestal.

In some embodiments, the method further comprises: employing another existing electrically conducting twisted wire pair connection from the network switching node to another first customer premises equipment; wherein the connections form a ring topology for the DSL network.

In some embodiments, the connections form a linear ADM for the DSL network.

According to another broad aspect, the invention provides a customer communications node for use in a wireline network, the wireline network having electrically conducting twisted wire pair interconnections between a plurality of customer communications nodes, the customer communications node being connectable to at least one communication device and comprising: a first communication port for connection with a first electrically conducting twisted wire pair interconnection; a second communication port for connection with a second electrically conducting twisted wire pair interconnection; at least one device interface for connecting to the at least one communication device; and an add/drop multiplexer adapted to: a) drop DSL packet data received via at least one of the first communication port and the second communication port if the packet data is in respect of communication to the at least one communication device and/or the customer communications node; b) pass through, whether by terminating and re-transmitting or other method, received DSL packet data over at least one of the first communication port and the second communication port if the received packet data is not in respect of communication to the at least one communication device and/or the customer communications node; and c) add DSL packet data via at least one of the first communication port and the second communication port, the packet data being in respect of communication from the at least one communication device and/or the customer communications node.

In some embodiments, the at least one communication device comprises at least one analogue device; and the at least one device interface comprises A/D (analogue to digital) circuitry and D/A (digital to analogue) circuitry for converting signals between analogue form and digital form for the at least one analogue device.

In some embodiments, the customer communications node is further adapted to: extract power from at least one of the first communication port and the second communication port; and provide at least some of the extracted power to the at least one device interface.

In some embodiments, the at least one communication device comprises a low current consumption user device, the customer communications node further comprising: a power supply for supplying power to the customer communications node and to the low current consumption device user device such that the low current consumption device user device is operable notwithstanding a electricity mains power failure, the power supply being powered by at least one of the first communication port and the second communication port.

In some embodiments, the low current consumption device user device is a telephone.

In some embodiments, the customer communications node further comprises: a wireless interface through which the reach of the wireline network can be extended to reach other devices not connected directly by wireline connections.

In some embodiments, the customer communications node further comprises: a wireless interface through which protection switching is performed in the event of failure of one or more wireline connections.

In some embodiments, the customer communications node further comprises: a wireless interface through which a ring topology connecting two linear ADM topologies can be completed.

According to another broad aspect, the invention provides a method comprising: at least one first customer communications node receiving DSL traffic; and each of a plurality of customer communications nodes one of which is said first customer communications node performing packet add/drop functionality, and regenerating and sending DSL traffic over a direct connection to a next communications node.

In some embodiments, the method further comprises: aggregating traffic for the plurality of customer communications nodes onto a logical connection comprising a plurality of electrically conducting twisted wire pairs; sending the traffic to a gateway node; the gateway node sending the traffic to the at least one first customer communications node.

BRIEF DESCRIPTION OF THE DRAWINGS

Preferred embodiments will now be described with reference to the attached drawings in which:

FIG. 4 is a schematic of a conventional topology having a plurality of VDSL (Very high bit rate DSL) DSLAM (DSL Access Multiplexer) star networks;

DETAILED DESCRIPTION OF THE PREFERRED EMBODIMENTS

Star Topology

Figure 1:
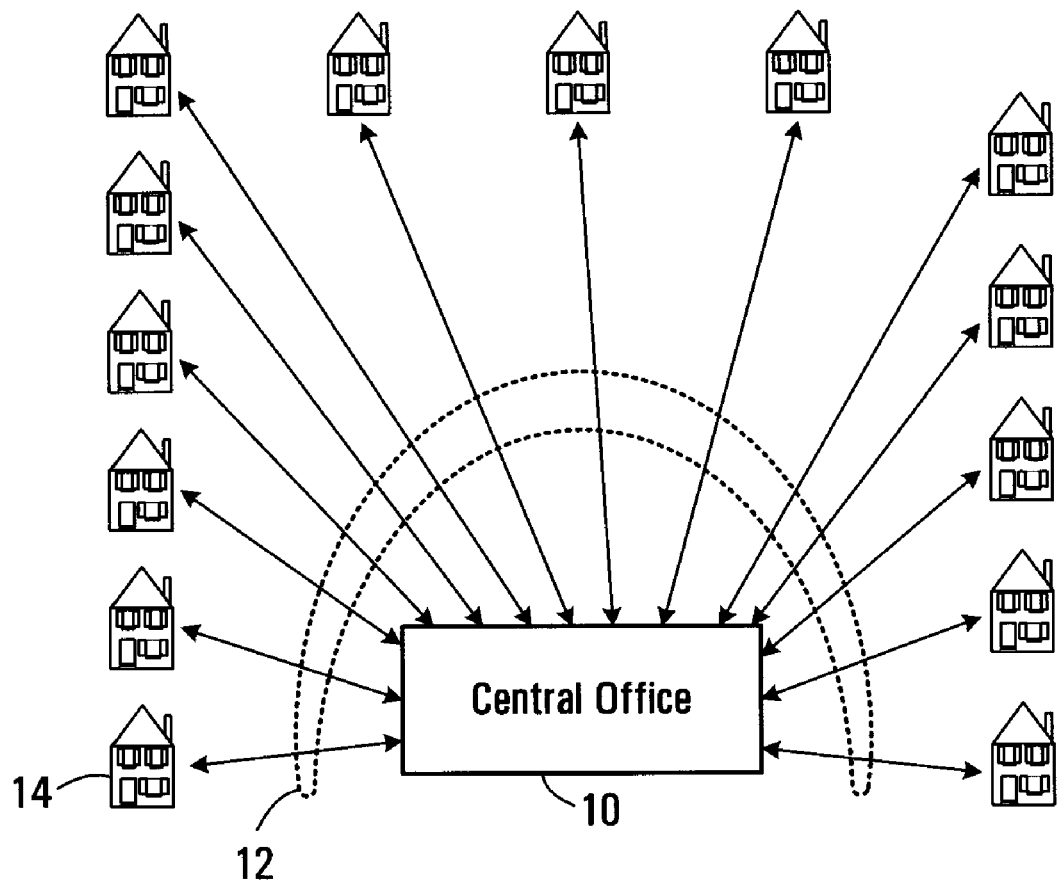
FIG. 1 is a schematic of a known network topology for connecting copper pairs between households and a central office.

Referring now to FIG. 1, shown is a schematic of a known network topology for connecting copper pairs between households and a central office. Many households 14 are interconnected with a single central office 10 using twisted pair cables 12 in a star network topology. The interconnections are generally referred to as the "last mile".

The transmission bandwidth of technologies such as DSL and Ethernet decreases with distance. In the current star network architecture, the DSLAM (DSL Access Multiplexer) is physically located in the middle, but the distance to each subscriber is often greater than the short distance required for maximum bandwidth. Since the telecom carriers wish to increase bandwidth to their customers, they need to keep the twisted pair distances as short as possible.

Ring Topology

Figure 2:
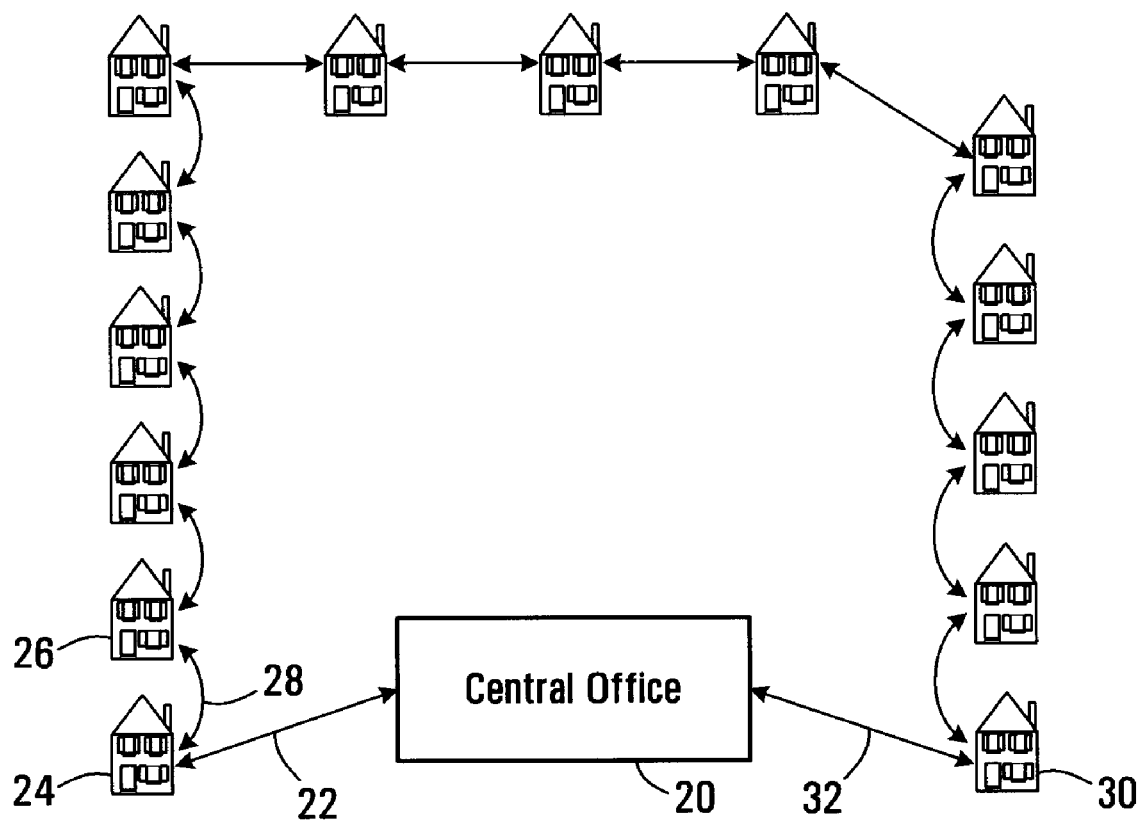
FIG. 2 is a schematic of an example ring network topology for connecting copper pairs between households and a central office in accordance with an embodiment of the invention.

Referring now to FIG. 2, shown is a schematic of an example ring network topology for connecting copper pairs between households and a central office in accordance with an embodiment of the invention. While throughout this description copper pairs are referred to, more generally any electrically conducting twisted wire pairs can be employed. Many households 24, 26, . . . , 30 and a single central office 20 are interconnected using twisted pair cables in a ring network topology. More specifically, the CO 20 is connected to a first household 24 with twisted pair cables 22; the first household 24 is connected to second household 26 with twisted pair cable 28 and so on to the last household 30, which is connected to the CO 20 with twisted pair cables 32. Each household has a customer communications node that provides packet add/drop functionality. In a particular example, the customer communications node is an HCC (Home Communications Centre), which enables DSL ring topologies in telecom service provider networks. The HCC is described in detail below with reference to FIG. 3A. A 'Ring' is a special case of the more general 'Daisy Chain of Add-Drop Multiplexers (ADMs)' where the 'Ring' goes out from, and returns to the same CO. Another example would be a set of ADMs between two different COs or even a serially-connected network 'stub' sometimes referred to as a linear ADM (i.e.: a set of ADMs that initiates from a CO but terminates at a site that is not another CO).

By physically, electrically, and/or logically connecting the twisted pair cables of customers so that the electrical distance is less than the maximum bandwidth distance of the layer 1 technology, service can be provided to subscribers at much greater distances from the DSLAM with very little investment in additional "last mile" cabling. Twisted pair rings greatly increase the distance and bandwidth carrying capability of the 'local loop'. High bandwidth is made available to the households by reducing the transmission distance to that between households instead of between households and Central Offices. Maximum bandwidth is obtained if the distance between houses connected together is less than the maximum bandwidth distance.

In some embodiments, existing "last mile" cables are utilised by the ring network. Existing "last mile" cables may include several copper pair wires bundled together extending out from a CO to several households. Copper pair wires may exist between households, but are connected between the household and the CO. By appropriately cutting a copper pair wire between a second house downstream in the cable from a first house and the CO and routing the cut end to a second house, a connection between two households is established using the existing cable. This process may be repeated to form complete ring network topologies. There may exist intermediate, non-powered technician access points in the larger cables. In some cases it may be possible to achieve the ring topology by simply "jumpering" twisted pairs together inside these access points so that no actual "cutting of wires" is necessary.

In some implementations, if one household does not want the ring service they are bypassed on the ring. Therefore, the ability to bypass individual homes that choose not to accept the new technology is included.

In some implementations, route diversity of the connections to the CO (central office) is provided by more than one path from each consumer to the CO. The ring provides this inherently. For example, a given household may communicate with the CO by an Eastbound or a Westbound path.

In some implementations, once the new topology is available, a complete package of services with a documented feature evolution is implemented. The complete package may for example include combinations of features such as Internet Home Theatre or Internet Protocol TeleVision (IPTV), Automatic Meter Reading (AMR), Home Security Monitoring, Virtual Private Networking, Internet Security and Connection Maintenance (i.e.: platform updates performed without customer intervention), and Medical Aid Monitoring.

HCC (Home Communications Centre)

Figure 3A:
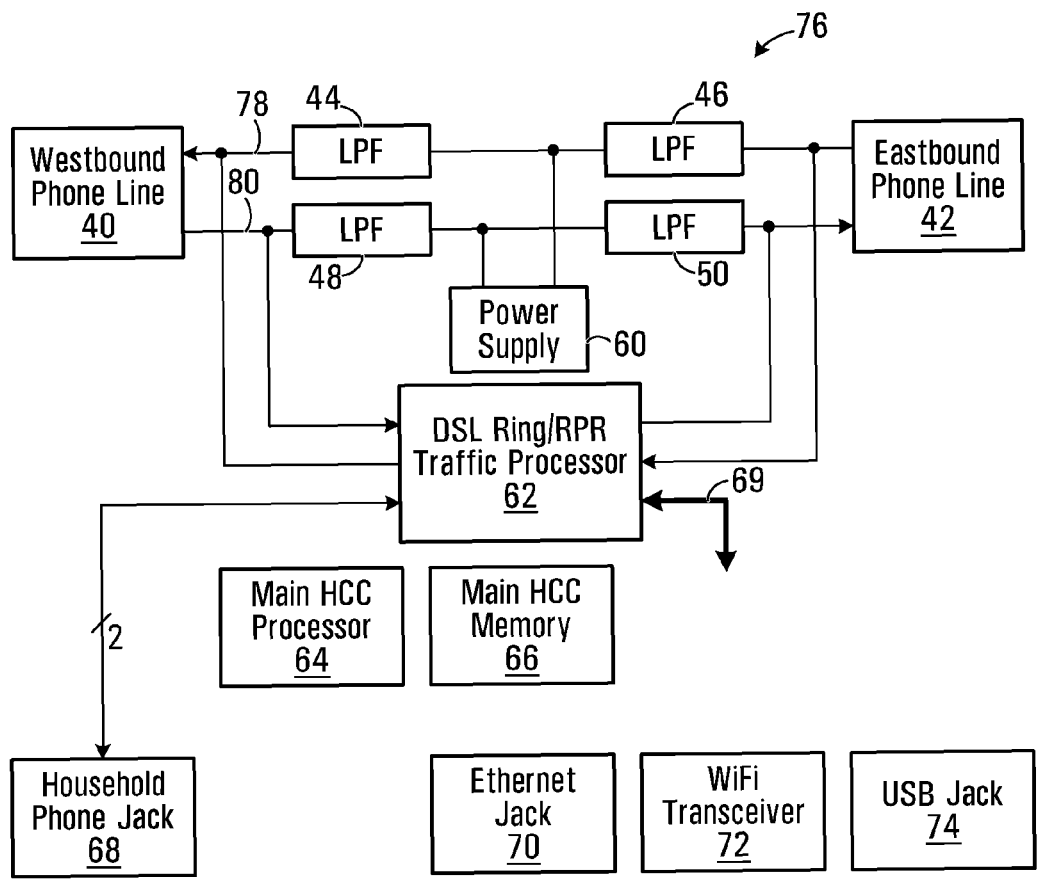
FIG. 3A is a block diagram of an example HCC (Home Communications Centre) in accordance with an embodiment of the invention.

Referring now to FIG. 3A, shown is a block diagram of an example HCC (Home Communications Centre) in accordance with an embodiment of the invention generally indicated at 76. It is to be understood that the HCC 76 shown in FIG. 3A is very specific for example purposes only. The HCC 76 is coupled to a westbound phone line 40 and an eastbound phone line 42. References to "eastbound" and "westbound" do not of course necessarily imply east or west, but simply the two directions that the ring can be connected to a given HCC. Each phone line has a copper pair of wires. The HCC has a DSL Ring/RPR traffic processor 62 coupled to the westbound phone line and the eastbound phone line. The HCC also has a main HCC processor 64 and a main HCC memory 66. A power supply 60 is coupled to the westbound phone line 40 and the eastbound phone line 42 via respective LPFs (low pass filters) 44,46,48,50. A household phone jack 68 is coupled to the DSL Ring/RPR traffic processor 62. Other possible interfaces include an Ethernet jack 70, a WIFI transceiver 72, and a USB jack 74. There may be other components, but they are not shown for sake of simplicity. The traffic processor 62 has add/drop ports 69 that connect the various interfaces to the traffic processor.

In operation, the combination of the DSL Ring/RPR traffic processor 62, the main HCC processor 64, and the main HCC memory 66 is adapted to process all communications over the westbound phone line 40 and/or the eastbound phone line 42. Processing communications includes packet add/drop functionality. For example, if the DSL Ring/RPR traffic processor 62 receives a packet on the westbound phone line 40, it may handle the packet if it is addressed to the present HCC 72, or forward the packet to its destination via the eastbound phone line 42 if it is addressed to another HCC. In some implementations, packets are routed on a per packet basis. The HCC 76 may also generate packets associated with a local communication device and forward the packets to their destination. In some embodiments, protection switching of traffic is handled by an industry-standard protocol designed specifically for this task. An example of this would be Resilient Packet Ring (RPR, IEEE 802.17) technology. RPR was developed for the optical transport infrastructure, but fits well into this application.

There are two twisted copper pairs: the eastbound phone line 40, and the westbound phone line 42 (i.e.: in opposite directions). In some implementations, communication over a phone line is bi-directional using unidirectional communication over each copper wire in a copper pair. For example, as indicated by arrows in the illustrated example, communication may traverse westward using the topmost copper wire 78 while communication may traverse eastward using the other copper wire 80. In some embodiments, the data rate is symmetrical (i.e.: transmit bit rate=receive bit rate) for both Eastbound and Westbound directions. A similar approach can be used on the eastbound phone line 42. In some embodiments, flow control mechanisms are used so that the data rate is the same around the ring and so that there are no links that are faster than others. A given household may communicate with the CO by an Eastbound path and/or a Westbound path. In some implementations, if communication via one direction is not possible, then communication via the other direction is attempted.

Since a number of households are occupying a single ring, there is no baseband channel available for each household for analogue communication although it would be technically feasible to provide a single base band channel in each direction, for example to a first household in each direction. As such, conventional POTS (Plain Ordinary Telephone Service) communications such as telephone and FAX are also digitized and sent on the ring. Thus, communication over the eastbound phone line and the westbound phone line is digital only, for example using DSL communication. Accordingly, if analogue devices, such as analogue telephones and fax machines, are to be interfaced with the HCC, then the HCC needs to provide D/A (digital to analogue) and A/D (analogue to digital) conversions. Such conversions are not necessary for interfacing the HCC with digital communication devices. Also, in such implementations, the CO ensures that communication transmitted to an HCC is digital. Digital communication comprises data packet communication. DSL communication is an example of digital communication.

The household phone jack 68, the Ethernet jack 70, and the WiFi transceiver 72 provide communication interfaces for the household. The USB jack 74 enables memory and maintenance access for the HCC 76 when it is installed. The HCC 76 may be installed in a residence and preferably remains with the residence permanently. This can be used to enable AMR (automatic meter reading) functionality. In some implementations, the architecture combines existing home phones with mobile phones. This may for example include most recent and/or backward compatible wireless interfaces. In some embodiments, the HCC 76 has a wireless interface, for example the WiFi (IEEE 802.11 a/b/g) interface 72 to enable communication with wireless devices, for example wireless appliances, stereos, PCs, TVs, meters, mobile phones, Set Top Boxes (STBs), etc.

In some implementations, a QoS (quality of service) is provided so as to provide certain communications with greater priority than other communications. A list of example communications with decreasing priorities may be VoIP communication, streaming video communication, and non-streaming data communication. Having a greater priority provides streaming communication with a greater likelihood of being uninterrupted and having less latency and/or jitter. In some implementations, a COS (class of service) is used as detailed in the RPR specification so as to prioritize traffic on the ring. This enables carriers to sell what are referred to as SLAs (service level agreements) to their customers based on traffic volume at each priority level. For example, customer A gets N GB/month of Priority 1 traffic and M GB/month of Priority 2 traffic, etc. while customer B may get totally different traffic profiles.

In some embodiments, the HCC is partially powered from the phone lines so there is no dependency on household current supply for land line-based phone service. In some implementations, the household phone jack 68 and the traffic processor 62 are powered by at least one of the phone lines while the remaining components may be powered by household current (i.e.: would have to be 'plugged in'). For example, each phone line could supply power via the potential difference between the first copper wire 78 at −48V and the second copper wire 80 at 0V in a DC-based architecture. The LPFs 44,46,48,50 remove digital signals from the westbound phone line 40 and the eastbound phone line 42. By using power from the phone line, lightening threats to CO equipment is reduced, as the lightening strike would be eliminated by the first homes that it touches in both directions.

In some embodiments, the traffic processor 62 controls the traffic that is on the ring via the RPR protocol and VDSL2 standards. For such implementations, it also controls the VDSL2 interface chips. It will also control the bandwidth asymmetry (see above) and any protection switching activity.

The main processor 64 might for example implement functions such as the firewall/VPN, control of the WiFi interface, control communications with the network, access rule implementations (i.e.: user authentication, WiFi interface logical segmentation between users, etc.), possibly interface conversions as necessary (e.g.: USB), etc.

The number of HCCs that may be interconnected in a ring network is implementation specific. An example design consideration is the maximum number of HCCs that can be partially powered solely from the phone line so as to enable high impedance user devices to operate during a power failure. A low current consumption user device is a user device that does not draw a significant amount of current and can be powered solely by a phone line. A telephone that does not require a power connection is an example of a low current consumption user device. Under normal conditions, each HCC is plugged in so that it receives power from its household power. However, during a power failure, the household power may be absent. In some embodiments, the HCC has a local power supply that receives power from the phone line so that during a power failure the local power supply partially powers the HCC and powers a high impedance user device so that the user may operate the high impedance user device. In such implementations, a user is provided with at least basic telephony functionality during a power failure.

The ring topology and the HCC involve modification to the "last mile". The "last mile" has been seen as 'untouchable' for many reasons. First, it provides the customer with the perception that the bandwidth they have is not shared with other customers. This is true only until the traffic reaches the first access multiplexer in the network. From that point onwards all bandwidth is shared. Second, the star topology allows the telecom carrier to provide power to older telephones (i.e. those that do not have power cords) so that phone calls can still be made during a power failure. In some implementations, the HCC takes this into account and offers the capability to be powered from the telecom carrier Central Office (CO). Third, having a star topology means that no one else can 'listen' to another's phone calls, as there is no one else in the transmission path. In some implementations, the HCC provides similar capability via encryption.

Regarding the encryption of traffic, in some embodiments all traffic is encrypted around the ring so that no one will be able to 'listen' to another's traffic. The encryption may be end-to-end in nature (e.g.: between a user's PC and a server somewhere on the Internet) or simply around the ring as far as the gateway node (which will remove the encryption prior to sending it to the DSLAM in the CO).

It is to be understood that other implementations of the HCC are possible. In the illustrated example, specific example interfaces are shown. In a specific example, the HCC has an Internet firewall/VPN (Virtual Private Network), 2 or 3 phone jacks (RJ11), a USB port for memory and maintenance access, a WiFi interface, and an EtherNet cable jack (RJ45). However, more generally, any suitable interface or combination of suitable interfaces may be implemented. Also in the illustrated example, processing is accomplished using a specific implementation of processors and memory. More generally, processing may be accomplished using any appropriate implementation of software, hardware, firmware, or any appropriate combination of software, hardware and firmware. The minimum functionality that needs to be included in each communications node is a traffic add/drop function. In the above example this is implemented in the traffic processor but other implementations are possible.

Ring Vs. Star Configuration

The ring configuration provided by an embodiment of the invention and a conventional star configuration are compared. It is to be understood that this comparison is a very specific example comparison for the purpose of explanation. In this comparison, five specific ground rules apply:

1. Each house gets xDSL feed at 2 kft or less.
2. The xDSL technology is the same for the ring configuration and the star configuration.
3. Only DSL technology is considered.
4. Optimal, direct wiring is assumed.
5. 2 pairs of wire are assumed to be available to each house.

Using these specific ground rules, a ring configuration and a star configuration are compared.

Referring now to FIG. 4, shown is a schematic of a conventional topology having a plurality of VDSL (Very high bit rate DSL) DSLAM (DSL Access Multiplexer) star networks. There are 6 DSLAM stars 80, each represented by a circle having a radius of 2 kft and a diameter of 4 kft. Five of the DSLAM stars are outside of the central office 82. Each household occupies an area of 400 ft×400 ft.

Each DSLAM has at least 60 ports. External DSLAM requirements include cabinets, real estate for cabinets, power, fibre, installation of fibre, etc. Pair bonding may be used to increase bandwidth, but this requires new modems and there is uncertainty of impact on POTS (plain ordinary telephone service). No alteration to DSLAMs is required, as there is no RPR (resilient packet ring) implementation on the CO side and there are no additional OSS (operational support system) features required. The fibre is moved closer to the customer using FTTN architectures. High speed is not available until fibre is deployed. The upgrade path is FTTH (fibre to the home), and xPON (passive optical network). Equipment is installed external to the CO for local loop unbundling to enable telco-to-telco competition.

Figure 5:
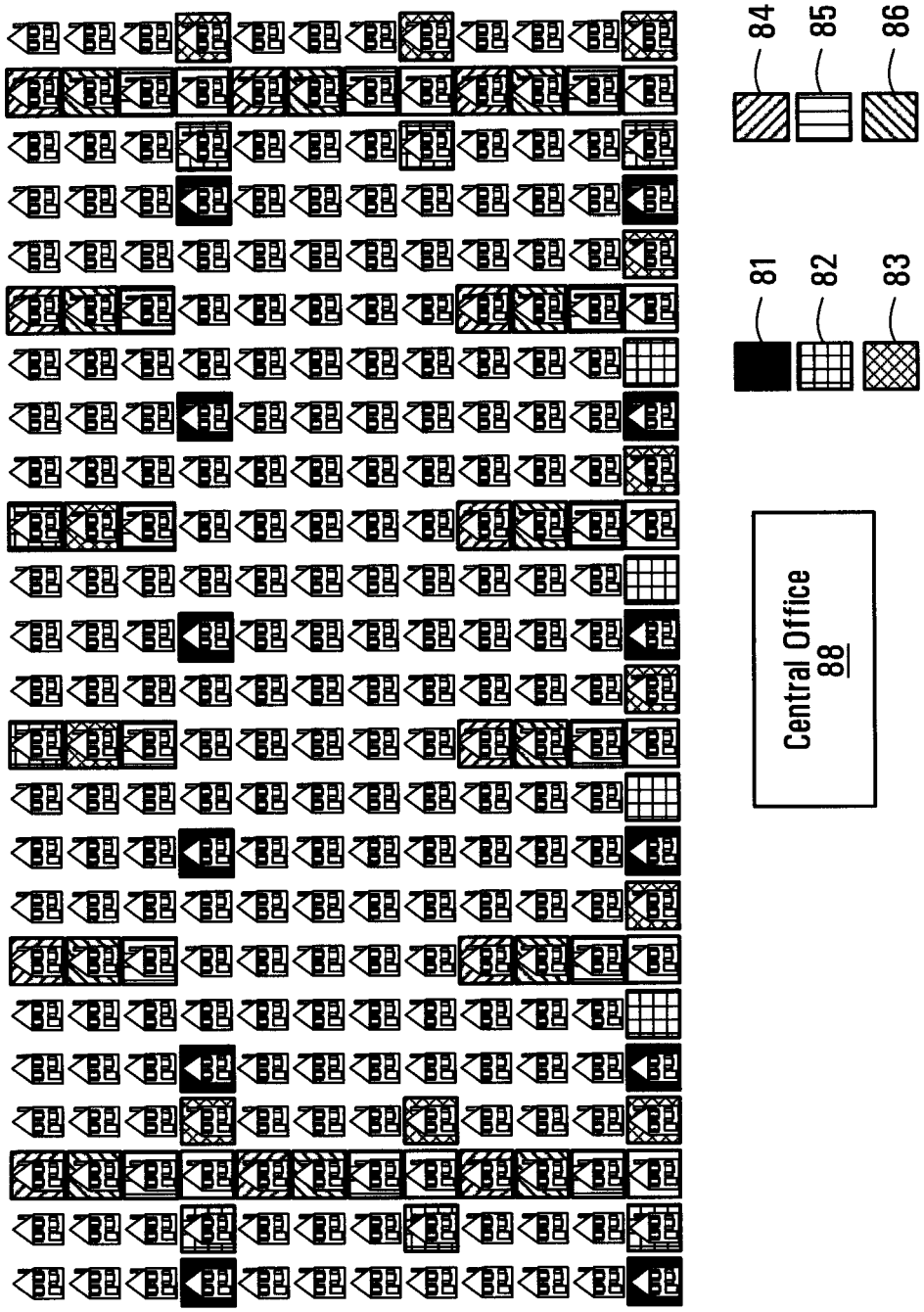
FIG. 5 is a schematic of an example topology having a plurality of VDSL (Very high bit rate DSL) ring networks in accordance with an embodiment of the invention.

Referring now to FIG. 5, shown is a schematic of an example topology having a plurality of VDSL (Very high bit rate DSL) ring networks in accordance with an embodiment of the invention. An array of houses is shown measuring 24 houses by 12 houses. The households each occupy an area of 400 ft×400 ft. The array has 24 VDSL Rings, which are stacked at 1.6 kft between nodes, six such rings shown in the legend as 81,82,83,84,85,86. There are 12 houses per VDSL ring. There is one DSLAM in the central office 88.

With this example, outside plant equipment external to the CO such as DSLAM equipment is not needed, even to allow telco competition or to "unbundle the local loop". The topology uses existing copper. No POTS filters are required. There is double the maximum bandwidth available at each house. The maximum bandwidth is achieved for a given house on a ring when all other houses on the ring are not using bandwidth and communication with the CO is via two communication paths. Only 48 DSLAM ports are required for 24 rings. There is increased survivability, as there are 2 paths to each house. In some implementations, ring protection switching can be performed in the case of a line cut. RPR is implemented on DSLAM analogue ports (defined as the ports that face the customer twisted pairs—the traffic will be digital in nature), as ports are paired. It is possible to have COS (classes of service), as traffic prioritization and shaping is possible. SLAs (service level agreements) include COS, as POTS is implemented via a standard SLA. There are new OSS features. The upgrade path is FTTH fibre rings or to reduce the number of homes on each ring. There is a different stacked ring for different telcos to enable telco-to-telco competition.

Other Wireline Topologies

The above description has focused on a ring topology. However, it is to be understood that a ring topology is not required. More generally, any appropriate topology interconnecting communication nodes may be implemented. A "communication node" generally refers to any node adapted to communicate with other nodes. A communication node may be a customer communication node, which is a node having an HCC and being associated with a user or household, or a central office communication node, which is a node associated with a central office. At least one of the nodes functions as a network switching device to interconnect the subscriber ring to the network. This node accepts traffic from the ring and forwards it on, and receives traffic for the ring and puts it onto the ring. In the example of FIG. 2, the network switching device is a central office while in the example of FIG. 6 described below, the network switching device is a gateway node in a pedestal. More generally still, the network switching device can be physically placed at any point, including mid-span, between the CO and the first customer. Of course, increasing the distance to the first customer will reduce the bandwidth capabilities.

An example of another topology is a linear ADM or "Daisy Chain" topology. A linear ADM topology may be implemented whereby a set of communication nodes are connected together in series. A ring topology is a topology in which two end communication nodes are interconnected. As a result of not having the two end communication nodes interconnected, a linear ADM topology does not have the same route diversity that a ring topology has. Nonetheless, the invention may be contemplated using a linear ADM topology.

Other Ring Network

Figure 6:
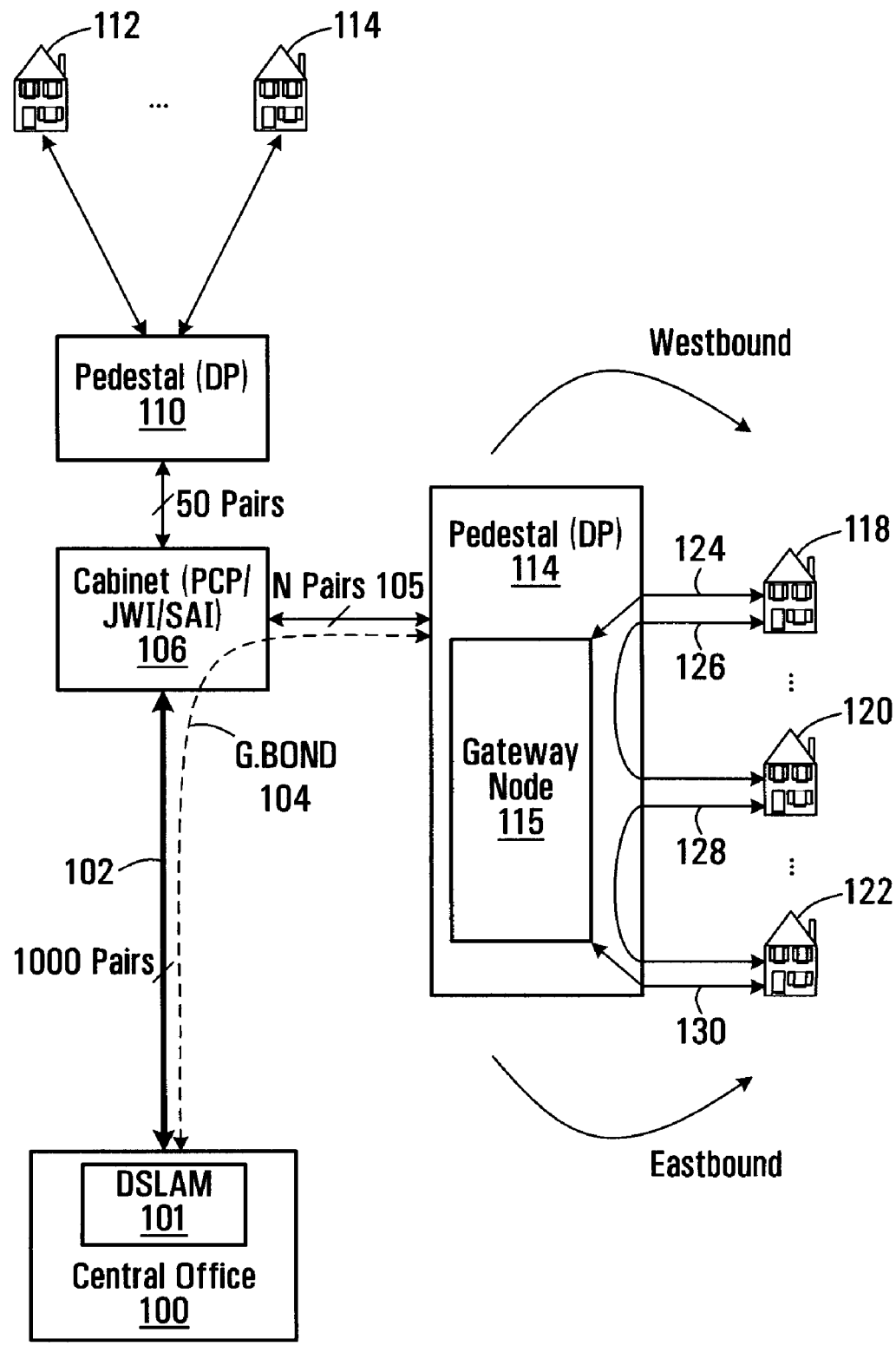
FIG. 6 is a block diagram of another network containing both a conventional star implementation and a ring network topology provided by an embodiment of the invention.

Referring now to FIG. 6, shown is another example of a DSL ring network provided by an embodiment of the invention. Shown is a set of households 118, 120, 122 connected in a ring configuration. The first household 118 is connected at 124 to a gateway node 115 forming part of pedestal 114. Similarly, household 122 is connected at 130 to the gateway node 115. The remaining households are connected in a ring similar to that of FIG. 2, but in this case the connections between consecutive houses on the ring go back through the pedestal 114. Thus, a connection 126 is shown between households 118 and 120, and a connection 128 is shown between households 120 and 122. More generally, an arbitrary number of households would be included on the ring. The pedestal 114 is shown connected via N Pairs 105 to a cabinet 106 (often called a Primary Connection Point—PCP—or Jumper Wiring Interface—JWI—or Service Access Interface—SAI—depending on the terminology of the network operator) which in turn is connected to a central office 100 having a DSLAM 101. The Pedestal 114 is connected to the Central Office 100 via the N Pairs 105 and N of the 100 pairs 102 in a manner similar to that described in G.Bond (ITU 998.1/2/3) 104. For the purpose of comparison, also shown is a conventional pedestal 110 connected to households 112, 114 in a star topology.

A pedestal typically includes a number of incoming pairs from a network, a patch panel that allows the connection of any pair going to a specific household to any of the incoming pairs. Thus for the conventional pedestal 110, the patch panel would allow households 112, 114 to be arbitrarily connected to respective ones of the 50 pairs incoming to the pedestal 110.

For the pedestal 114 that is participating in the DSL ring, only pairs 124 and 130 are connected to the gateway node 115. The remaining connections are between adjacent households. This can be achieved by making connections between a patch panel forming part of the pedestal 114. For example, the interconnection 126 between households 118 and 120 can be achieved by connecting a jumper between a first pair going from the pedestal to the first household 118, and a second pair going to the second household 120. In this manner the configuration of the DSL ring is very flexible and can easily be changed by simply modifying the set of patches. In the illustrated example, the bandwidth from the central office 100 to the pedestal 114 is provided through the previously introduced bonding approach. In particular, a set of pairs from the DSLAM 101 is grouped as a logical pipe that provides higher bandwidth than individual pairs. This logical pipe is then used to transmit packets to and from the gateway node 115 and any of the households on the DSL ring. For example, assuming individual pairs between the DSLAM 101 and the gateway node 115 support 4 Mb/s each, this being a function of the distance between the DSLAM 101 and the gateway node 115, and 50 such pairs can be combined to produce 200 Mb/s bandwidth; this can be passed around the ring with 100 Mb being transmitted in each direction by the gateway node 115. Regarding the availability of double the maximum VDSL2 bandwidth, home routers may be able to handle less than this amount, for example 100 MB/s. This would not pose a problem so long as there is not more than that amount of traffic to drop at a given household. The maximum VDSL2 ring bandwidth in a symmetrical implementation is 200 MB/s.

Figure 3B:
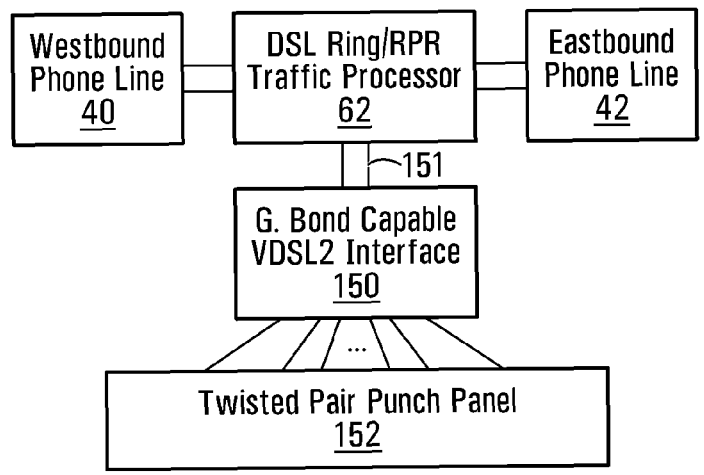
FIG. 3B is a block diagram of gateway node functionality in accordance with an embodiment of the invention.

In some embodiments, the gateway node 115 behaves very much the same as the HCC on any of the households. FIG. 3B shows additional functionality that might be included in some gateway node implementations. This includes a G.Bond capable VDSL2 interface 150 and a twisted pair punch panel 152. More generally, any set of components capable of exchanging traffic with the main network and the DSL ring can be used. This can be included in any gateway node that also includes a traffic processor that is basically the same as in the HCC described above. In this case, the G.Bond capable interface 150 behaves in the same way as a communications device on the above described HCC, and is shown connected to an add/drop port 151 of the traffic processor 62; the only difference here is that substantially all of the traffic will be going to/from that device, with the exception of any control or monitoring traffic that might be terminated at the gateway node per se. A gateway node may include additional communications interfaces such as a USB port(s), WiFi ports, etc. as described for the HCC.

As can be seen from FIG. 6, the G.Bond protocol 104 is used to obtain maximum bandwidth from the CO 100 to the pedestal 114. The gateway node 115, which maybe environmentally hardened and powered via the twisted pairs from the CO, terminates the G.Bond 104 traffic and acts as a gateway for the DSL ring.

Figure 7:
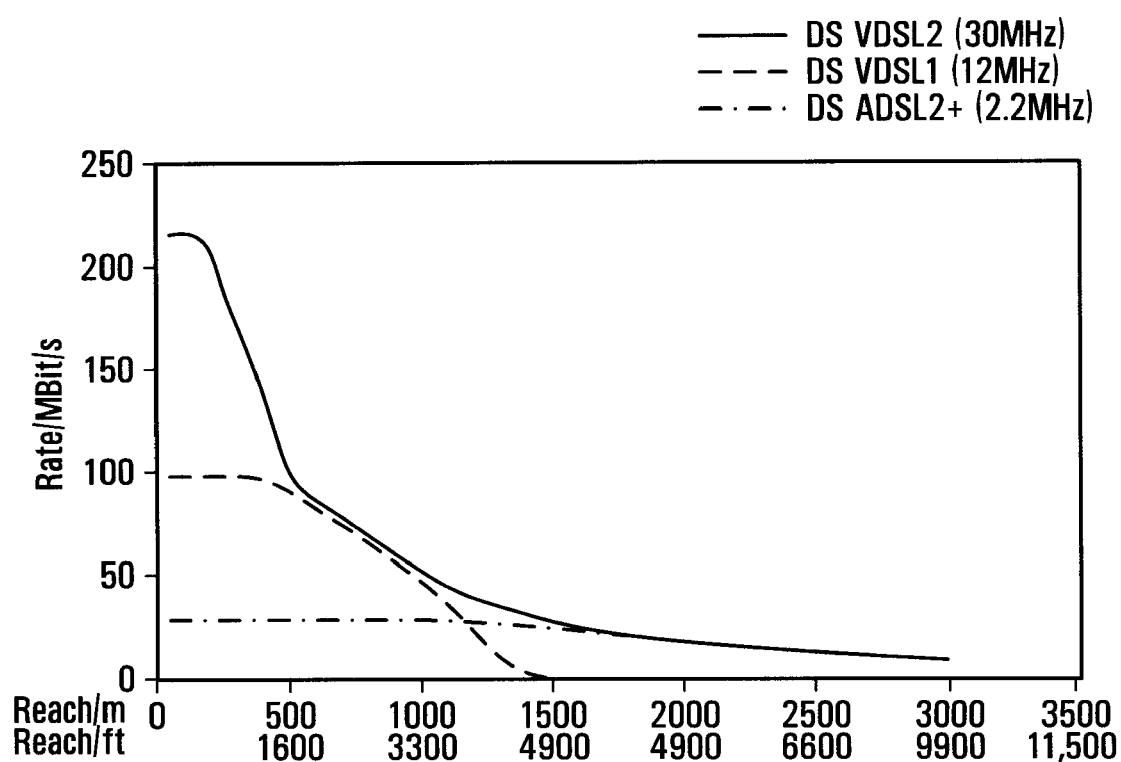
FIG. 7 is a graph showing bandwidth versus reach for various DSL technologies.

In some embodiments, at each node in the ring is a full ADM, based on VDSL2. The DSL transmission distance starts at zero again on each individual hop. In most cases these hops back to the pedestal and then to the neighbour's house is less than 250 meters (<1000 ft). VDSL2 bandwidth at this distance is in the >100 Mb/s range (depending on VDSL2 chipset manufacturer's specifications). The bandwidth reach of various DSL technologies is shown in FIG. 7.

With rings there are two paths into and out of each house, each with the potential capability of carrying >100 Mb/s. Therefore the bandwidth potential for this scenario is potentially greater than 200 Mb/s (100 Mb/s Eastbound and 100 Mb/s Westbound) depending on the number of bonded pairs and the actual distance from the DSLAM to the pedestal.

Basically the greater the number of subscribers on the ring, the greater the bandwidth pool available due to the greater number N of pairs available for bonding in the G.Bond 104 stream.

Rings also have the advantage of protecting themselves such that, if a single pair is cut, the traffic can be sent in the opposite direction to get to the gateway node. This is incredibly useful for maintenance purposes as well as adding and removing nodes (houses) to/from the ring. This allows for a deployment business case based on customer demand which eliminates the sunken investment in a 'build it and they will come' approach. This is also true of bonding so that houses can be added to the ring as subscribers sign up for the service.

In some embodiments, Local Loop Unbundling (LLU) is accomplished. In some embodiments this is achieved using the logical separation that is currently done via co-location in the CO (i.e.: the traffic is carried by the incumbent from the customer to the CO and then handed off). In other embodiments, another gateway node is installed in the pedestal along with co-location in the CO. This allows for physical separation of the rings on a carrier-by-carrier basis. Space considerations in the pedestal may become an issue depending on the number of carriers that need to be supported in this fashion. A more pragmatic approach would have competitive carriers paying for the CPE (customer premises equipment) and jumper installation in the pedestal.

If someone cuts their phone line one characteristic of the ring architecture is that the ring can be self-protecting. If the traffic cannot get to the gateway node in one direction, for example as would be the case, it is routed in the other direction. This scenario would generate alarms to the carrier, which would be acted upon according to carrier-specific procedures. The point is that nodes (residences) may take themselves out of the ring for whatever reason but they cannot, alone, cause their neighbours to loose their connectivity to the network. If a WiFi interface is included in the CPE a wireless mesh may be implemented by the carrier so that another protection path is available in the case of a cable cut. The mesh implementation, depending on wireless transmission signal strength and transmission distance, may act as a bridge to another physically wired ring. In some implementations, each customer communications node has a transceiver adapted to communicate with another customer communications node over a wireless connection. The wireless connection allows for an alternative communication path to the CO in case an existing communication path to the CO becomes inoperable.

In another embodiment, a wireless interface can be used through which the reach of the wireline network can be extended to reach other devices not connected directly by wireline connections. A second set of households are connected in a similar manner as described for the main network (the network describe in previous embodiments), with wireline connections between pairs of households in a linear manner that might form a ring or linear ADM for example. At least one of the households has a wireless connection to one of the households on the main network.

In some embodiments, as described above, a wireless interface is available for performing protection switching in the event of failure of one or more wireline connections.

In some embodiments, a wireless connection can be used between the endpoints of two linear ADM topologies to complete a ring topology.

In some embodiments, the ring transmission protocol is based on the IEEE 802.17 Resilient Packet Ring (RPR) standard with some modifications to allow for different possible bandwidths between nodes and overall lower peek bandwidths. RPR was designed for metro optical networks.

In the embodiments described, packet add/drop functionality is included in each node to add/drop packets. More generally, traffic add/drop functionality is included. This might include packet add/drop functionality, or traffic implemented using timeslots or wavelengths/frequencies to name a few specific examples.

In some embodiments, the packet add/drop is in respect of DSL communication. This may for example be ADSL (Asynchronous DSL), SDSL (Symmetric DSL), Uni-DSL (Universal DSL), VDSL (Very high bit rate DSL), and VDSL2 (Very high bit rate DSL version 2) or a future iteration of DSL.

Numerous modifications and variations of the present invention are possible in light of the above teachings. It is therefore to be understood that within the scope of the appended claims, the invention may be practised otherwise than as specifically described herein.

We claim:

1. A wireline network comprising:
at least one network connection connecting at least one telephony network switching device to a respective first customer communications node;
a plurality of second customer communications nodes distributed amongst a plurality of customer premises;
a plurality of interconnections between the customer communications nodes, inclusive of the respective first customer communications node and the plurality of second customer communication nodes, such that all of the customer communications nodes are interconnected in a linear manner across the plurality of customer premises and have at least one communications path to the at least one telephony network switching device, each interconnection comprising an electrically conductive twisted wire pair; and
a traffic add/drop function in each customer communications node.

2. The wireline network of claim 1 further comprising:
a second plurality of customer communications nodes;
a plurality of interconnections between the second plurality of customer communications nodes such that all customer communications nodes of the second plurality are linearly connected, each interconnection comprising an electrically conductive twisted wire pair; and
at least one wireless connection connecting at least one of the second plurality of customer communications nodes to one of the first plurality of customer communications nodes; and
a traffic add/drop function in each of the second plurality of customer communications nodes.

3. The wireline network of claim 1, wherein the traffic add/drop function is configured to communicate digitized voice data as part of data packets communicated over the linear arrangement of interconnections between the customer communications nodes and the at least one telephony network switching device of the wireline network.

4. The wireline network of claim 1 wherein the traffic add/drop function comprises a packet add/drop function.

5. The wireline network of claim 4 wherein the at least one telephony network switching device is selected from a group consisting of central office, DLC (digital loop carrier) node, a network POP (point of presence).

6. The wireline network of claim 4 wherein the at least one telephony network switching device is a gateway node in a pedestal.

7. The wireline network of claim 6 wherein the at least one network connection connecting the at least one telephony network switching device to the respective first customer communications node comprises at least one connection between the gateway node and the respective first customer communications node.

8. The wireline network of claim 6 wherein:
the gateway node is connected to a plurality of network-side electrically conducting twisted wire pairs operable to pass traffic to and from the at least one connection between the gateway node and the respective first customer communications node.

9. The wireline network of claim 8 wherein the at least one connection between the gateway node and the respective first customer communications node comprises a respective network connection between the gateway node and each of two first customer communications nodes.

10. The wireline network of claim 4 wherein the interconnections form a ring topology.

11. The wireline network of claim 10 wherein traffic flows in both directions around the ring topology.

12. The wireline network of claim 4 wherein the interconnections form a linear ADM (add drop multiplexer).

13. The wireline network of claim 4 wherein the packet add/drop functionality in each customer communications node drops packets received on the network for the customer communications node, and adds packets to the network from the customer communications node.

14. The wireline network of claim 13 wherein the packet add/drop function is in respect of DSL (Digital Subscriber Line) communication.

15. The wireline network of claim 14 wherein the DSL communication is selected from a group consisting of ADSL (Asynchronous DSL), SDSL (Symmetric DSL), Uni-DSL (Universal DSL), VDSL (Very high bit rate DSL), and VDSL2 (Very high bit rate DSL version 2).

16. The wireline network of claim 13 wherein each customer communications node comprises:
circuitry for extracting power supply signals transmitted from the at least one telephony network switching device over the interconnections.

17. The wireline network of claim 13 wherein for each customer communications node:
the packet add/drop function extracts packets that are for the particular customer communications node, and regenerates all other packets and forwards them on;
each packet dropped is passed on digitally to a digital interface, or converted to analog form and passed on to an analog interface.

18. The wireline network of claim 13 wherein each customer communications node comprises:
a local source of power generated from electricity mains power.

19. The wireline network of claim 4 wherein at least some of the interconnections are formed of sections of electrically conducting twisted wire pairs of an existing star topology network.

20. The wireline network of claim 4 wherein each customer communications node comprises a transceiver configured to communicate with another of the customer communications nodes over a wireless connection to establish an alternative interconnection between the customer communications nodes for the packet add/drop functionality.

21. The wireline network of claim 20 wherein the wireless connection forms part of an alternative communication path to the at least one telephony network switching device in case an existing communication path to the at least one telephony network switching device via the interconnections becomes unavailable.

22. A method of forming a DSL network comprising:
employing an existing electrically conducting twisted wire pair connection from a network switching node to a first customer premises equipment;
disconnecting an existing electrically conducting twisted wire pair connection from the network switching node to second customer premises equipment;
re-connecting the existing electrically conducting twisted wire pair connection between the first customer premises equipment and the second customer premises equipment, such that the first customer premises equipment and the second customer premises equipment are interconnected; and
for other customer premises equipment, repeating the disconnecting and re-connecting for other existing electrically conducting twisted wire pair connections between the network switching node and the other customer premises equipment, such that the customer premises equipment, inclusive of the first customer premises equipment, the second customer premises equipment and the other customer premises equipment, are interconnected in a linear manner across a plurality of customer premises amongst which the customer premises equipment are distributed.

23. The method of claim 22 wherein the disconnecting and re-connecting are performed in a patch panel in a pedestal.

24. The method of claim 22 further comprising:
employing another existing electrically conducting twisted wire pair connection from the network switching node to another first customer premises equipment;
wherein the connections form a ring topology for the DSL network.

25. The method of claim 22 wherein the connections form a linear ADM for the DSL network.

26. A customer communications node for use in a wireline network, the wireline network having electrically conducting twisted wire pair interconnections between a plurality of customer communications nodes distributed amongst a plurality of customer premises, such that the plurality of customer communications nodes are interconnected in a linear manner across the plurality of customer premises, the customer communications node being connectable to at least one communication device and comprising:
a first communication port for connection with a first electrically conducting twisted wire pair interconnection;
a second communication port for connection with a second electrically conducting twisted wire pair interconnection;
at least one device interface for connecting to the at least one communication device; and
an add/drop multiplexer configured to:
a) drop DSL packet data received via at least one of the first communication port and the second communication port if the packet data is in respect of communication to the at least one communication device and/or the customer communications node;
b) pass through, whether by terminating and re-transmitting or other method, received DSL packet data over at least one of the first communication port and the second communication port if the received packet data is not in respect of communication to the at least one communication device and/or the customer communications node; and
c) add DSL packet data via at least one of the first communication port and the second communication port, the packet data being in respect of communication from the at least one communication device and/or the customer communications node.

27. The customer communications node of claim 26 wherein:
the at least one communication device comprises at least one analogue device; and
the at least one device interface comprises A/D (analogue to digital) circuitry and D/A (digital to analogue) circuitry for converting signals between analogue form and digital form for the at least one analogue device.

28. The customer communications node of claim 26 further configured to:
extract power from at least one of the first communication port and the second communication port; and
provide at least some of the extracted power to the at least one device interface.

29. The customer communications node of claim 26 wherein the at least one communication device comprises a low current consumption user device, the customer communications node further comprising:
a power supply for supplying power to the customer communications node and to the low current consumption user device such that the low current consumption user device is operable notwithstanding an electricity mains power failure, the power supply being powered by at least one of the first communication port and the second communication port.

30. The customer communications node of claim 29 wherein the low current consumption user device is a telephone.

31. The customer communications node of claim 29 further comprising:
a wireless interface through which the reach of the wireline network can be extended to reach other devices not connected directly by wireline connections.

32. The customer communications node of claim 29 further comprising:
a wireless interface through which protection switching is performed in the event of failure of one or more wireline connections.

33. The customer communications node of claim 29 further comprising:
a wireless interface through which a ring topology connecting two linear ADM topologies can be completed.

34. The customer communications node of claim 26, wherein the add/drop multiplexer is further configured to communicate digitized voice data as part of data packets in the same data packet stream as DSL packet data communicated over the linear arrangement of interconnections between the customer communications nodes.

* * * * *